(12) United States Patent
Gibson et al.

(10) Patent No.: US 7,074,740 B2
(45) Date of Patent: Jul. 11, 2006

(54) CATALYST FOR CONVERSION PROCESSES

(75) Inventors: Kirk R. Gibson, El Cerrito, CA (US); Richard Threlkel, El Cerrito, CA (US); Pak C. Leung, Lafayette, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/190,202

(22) Filed: Jul. 2, 2002

(65) Prior Publication Data

US 2004/0004030 A1  Jan. 8, 2004

(51) Int. Cl.
*B01J 23/00* (2006.01)
*B01J 27/00* (2006.01)

(52) U.S. Cl. ............... 502/322; 502/211; 502/213; 502/314; 502/315; 502/323

(58) Field of Classification Search ........ 502/208, 502/211, 322, 315, 314, 213, 323
See application file for complete search history.

(56) References Cited

U.S. PATENT DOCUMENTS

| | | | | |
|---|---|---|---|---|
| 3,867,282 A | * | 2/1975 | Fischer et al. | 208/216 |
| 4,008,149 A | * | 2/1977 | Itoh et al. | 208/216 |
| 4,081,408 A | * | 3/1978 | Fischer et al. | 502/306 |
| 4,306,964 A | * | 12/1981 | Angevine | 208/210 |
| 4,394,303 A | * | 7/1983 | Gibson | 502/305 |
| 4,399,026 A | * | 8/1983 | Shiroto et al. | 208/216 PP |
| 4,435,278 A | * | 3/1984 | Chen | 208/251 H |
| 4,456,701 A | * | 6/1984 | Chen | 502/221 |
| 4,489,173 A | * | 12/1984 | Gibson | 502/313 |
| 4,525,472 A | * | 6/1985 | Morales et al. | 502/323 |
| 4,600,503 A | * | 7/1986 | Angevine et al. | 208/251 H |
| 4,743,572 A | * | 5/1988 | Angevine et al. | 502/64 |
| 4,834,869 A | * | 5/1989 | Angevine et al. | 208/213 |
| 4,981,832 A | * | 1/1991 | Tawara et al. | 502/314 |
| 5,076,908 A | | 12/1991 | Stangeland et al. | |
| 5,187,133 A | * | 2/1993 | Yoshinari et al. | 502/66 |
| 5,472,928 A | | 12/1995 | Scheuerman et al. | |
| 5,492,617 A | | 2/1996 | Trimble et al. | |
| 5,498,327 A | | 3/1996 | Stangeland et al. | |
| 5,527,512 A | | 6/1996 | Bachtel et al. | |
| 5,589,057 A | | 12/1996 | Trimble et al. | |
| 5,599,440 A | | 2/1997 | Stangeland et al. | |
| 5,603,904 A | | 2/1997 | Bachtel et al. | |
| 5,648,051 A | | 7/1997 | Trimble et al. | |
| 5,660,715 A | | 8/1997 | Trimble et al. | |
| 5,885,534 A | | 3/1999 | Reynolds et al. | |
| 5,916,529 A | | 6/1999 | Scheuerman | |
| 6,031,146 A | | 2/2000 | Bachtel | |
| 6,086,749 A | | 7/2000 | Kramer et al. | |

* cited by examiner

*Primary Examiner*—Steven Bos
(74) *Attorney, Agent, or Firm*—Steven H. Roth

(57) ABSTRACT

An improved catalyst for hydrodesulfurization of heavy feedstocks is disclosed. The catalyst is adopted for on-stream catalyst replacement in upflow processing units. It is characterized by a smaller peak pore diameter than general purpose hydrotreating catalysts.

12 Claims, 3 Drawing Sheets

CATALYST FOR CONVERSION PROCESSES

FIELD OF THE INVENTION

This invention relates to catalysts for hydroprocessing heavy hydrocarbon feed streams. More particularly, it concerns an improved catalyst for hydrodesulfurization of heavy hydrocarbon feed streams and hydroprocesses involving this catalyst, optionally in combination with hydrometallation catalysts.

BACKGROUND OF THE INVENTION

Hydroprocessing or hydrotreatment to remove undesirable components from hydrocarbon feed streams is a well known method of catalytically treating such heavy hydrocarbons to increase their commercial value. "Heavy" hydrocarbon liquid streams, and particularly reduced crude oils, petroleum residua, tar sand bitumen, shale oil or liquified coal or reclaimed oil, generally contain product contaminants, such as sulfur, metals and organo-metallic compounds which tend to deactivate catalyst particles during contact by the feed stream and hydrogen under hydroprocessing conditions. Such hydroprocessing conditions are normally in the range of 212° F. to 1200° F. (100 to 650° C.) at pressures of from 20 to 300 atmospheres. Generally such hydroprocessing is in the presence of a catalyst containing group VI or VIII metals such as platinum, molybdenum, tungsten, nickel, cobalt, etc., in combination with various other metallic element particles of alumina, silica, magnesia and so forth having a high surface to volume ratio. More specifically, catalysts utilized for hydrodemetallation, hydrodesulfurization, hydrocracking etc., of heavy oils and the like are generally made up of a carrier or base material; such as alumina, silica, silica-alumina, or possibly, crystalline aluminosilicate, with one more promoter(s) or catalytically active metal(s) (or compound(s)) plus trace materials. Typical catalytically active metals utilized are cobalt, molybdenum, nickel and tungsten; however, other metals or compounds could be selected dependent on the application.

Because these reactions must be carried out by contact of a hydrogen-containing gas with the hydrocarbon feed stream at elevated temperatures and pressures, the major costs of such processing are essentially investment in vessels and associated furnaces, heat exchangers, pumps, piping and valves capable of such service and the replacement cost of catalyst contaminated in such service. Commercial hydroprocessing of relatively low cost feed stocks such as reduced crude oils containing pollutant compounds requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen and sulfur compounds, while carrying out the desired reactions, such as demetallation, desulfurization, and cracking at elevated pressure and temperatures. Pumps, piping and valves for handling fluid streams containing hydrogen at such pressures and temperatures are also costly, because at such pressures seals must remain hydrogen impervious over extended service periods of many months.

Further, hydroprocessing catalyst for such a reactor, which typically contains metals such as titanium, cobalt, nickel, tungsten, molybdenum, etc., may involve a catalyst inventory of 500,000 pounds or more at a cost of $2 to $4/lb. Accordingly, for economic feasibility in commercial operations, the process must handle high flow rates and the vessel should be filled with as much catalyst inventory as possible to maximize catalyst activity and run length. Additionally, the down-time for replacement or renewal of catalyst must be as short as possible. Further, the economics of the process will generally depend upon the versatility of the system to handle feed streams of varying amounts of contaminants such as sulfur, nitrogen, metals and/or organic-metallic compounds, such as those found in a wide variety of the more plentiful (and hence cheaper) reduced crude oils, residua, or liquified coal, tar sand bitumen or shale oils, as well as used oils, and the like.

The need for high efficiency in hydroprocessing has led to the development of three basic hydroprocessing reactor configurations and a variety of catalysts for use in them.

These three configurations are as follows: (i) fixed bed downflow reactor systems (ii) ebullated or expanded type upflow reactor systems which are capable of on-stream catalyst replacement and are presently known to industry under the trademarks H-Oil® and LC Fining®; and (iii) the substantially packed-bed type upflow reactor systems having an on-stream catalyst replacement system, as more particularly described in U.S. Pat. No. 5,076,908 to Stangeland et al., having a common assignee with the current inventions and discoveries.

A fixed bed downflow reactor system may be defined as a reactor system having one or more reaction zones of stationary catalyst, through which feed streams of liquid hydrocarbon and hydrogen flow downwardly and concurrently with respect to each other.

An ebullated or expanded bed reactor system may be defined as a reactor system having an upflow type single reaction zone reactor containing catalyst in random motion in an expanded catalytic bed state, typically expanded from 10% by volume to about 35% or more by volume above a "slumped" catalyst bed condition (e.g. a non-expanded or non-ebullated state).

As particularly described in U.S. Pat. No. 5,076,908 to Stangeland et al., the substantially packed-bed type reactor system is an upflow type reactor system including multiple reaction zones of packed catalyst particles having little or no movement during normal operating conditions of no catalyst addition or withdrawal. In the substantially packed-bed type reactor system of Stangeland et al., when catalyst is withdrawn from the reactor during normal catalyst replacement, the catalyst flows in a downwardly direction under essentially plug flow or in an essentially plug flow fashion, with a minimum of mixing with catalyst in layers which are adjacent either above or below the catalyst layer under observation.

The catalysts of this invention are devised to be particularly advantageous in the upflow reactor systems identified as (ii) and (iii) just above. They could, however, be used in the conventional downflow fixed bed systems if desired.

As discussed in U.S. Pat. No. 5,076,908 to Stangeland et al. and in U.S. Pat. No. 5,472,928 to Scheuerman et al. (also commonly assigned herewith) the size, geometry and physical properties of the particles of a hydroprocessing catalyst can play a major role in determining the catalyst's effectiveness in the upflow "ebullated" bed designs and also in the upflow "packed" bed designs of Stangeland et al. and Scheuerman et al.

The physical characteristics of a catalyst also are important in determining whether or not the catalyst can be continuously renewed or replaced or whether the reactor needs to be periodically shut down to have its catalyst charge replaced. On-stream catalysts replacement or "OCR", which most commonly involves adding fresh catalyst to the top of a bed and taking spent catalyst out the bottom of the reactor, can offer the advantage of eliminating reactor downtime.

Since the late 1960's, there have been several heavy oil hydroprocessing units built and brought on stream that utilize the ebullated or expanded catalyst bed reactor technology where a hydrocarbon feed stream and hydrogen gas flow upwardly through a dilute phase reaction zone of catalyst in random motion. Stated alternatively, continuous operation of an ebullated or expanded bed hydroprocessing system include the upward flow of a hydrocarbon feed stream and hydrogen gas through a single catalyst containing vessel or a series of catalyst containing vessels. Reactor liquid is recirculated internally at rates sufficient to expand or ebullate the catalyst to produce a dilute phase reaction zone of catalyst in random or ebullating motion.

Catalyst is replaced by continuous or periodic, on-stream removal of catalyst from the vessel followed by addition. As noted above, such ebullation tends to increase the fluid volume in the vessel relative to catalyst volume necessary to hydroprocess the feed stream and hydrogen with the catalyst, with adequate contact time to react the fluids. Further, such ebullated beds tend to result in separation or segregation of "fines" (and heavier) particles as they pass downwardly through the upflow streams. As frequently happens, and especially where the catalyst is locally agitated, as by eddy currents, the particles tend to abrade by such higher flow rates of the feed streams through the ebullating bed. Depending on the size of the fines, they either travel upward where they contaminate the product or they tend to accumulate in the reactor because they cannot work their way down to the bottom of the bed. Such counterflow systems have also been used because of the relative ease of withdrawing limited amounts of the ebullated catalyst in a portion of the reacting hydrocarbon and hydrogen fluids, particularly where such turbulent flow of the catalyst is needed to assist gravity drainage through a funnel-shaped opening into a central pipe at the bottom of a vessel.

While it has been proposed heretofore to use plug-flow or packed-bed flow of catalyst to reduce such agitation and thus assure uniform disbursement of hydrogen throughout the liquid volume flowing upwardly through the catalyst bed, in general such flow has been controlled by limiting the maximum flow rate that can be tolerated without ebullating or levitating the bed more than about 10%. Further in prior systems where expansion of the bed is limited, hydrogen flow rates are made sufficiently high at the bottom of the bed to assure relative turbulence of the catalyst at the withdrawal point in the vessel. While this does assure such turbulence, it also wastes space, damages the catalyst and permits direct entrainment of hydrogen with catalyst entering the withdrawal tube. Such turbulent flow of catalyst apparently assists gravity removal of catalyst from the vessel.

The basic process designs of the ebullated bed reactors with appropriate mechanical features overcome some of the limitations of the conventional fixed bed reactor. The ebullated or expanded catalyst bed reactor schemes provide ability to replace catalyst on stream and operate with a very "flat" reaction zone temperature profile instead of the steeper pyramiding profile of conventional fixed bed reactors. The nature of the process, with a broad spectrum of catalyst size, shape, particle density, and activity level in random motion in a "dilute phase reaction zone," creates near isothermal temperature conditions, with only a few degrees temperature rise from the bottom to the top of the reaction zone. Quench fluids are not normally required to limit reaction rates except in cases when series reactors are applied. In other words, the reactor internal recycle oil flow, used to expand (or ebullate) the catalyst bed and maintain distribution (typically 10 to 1 ratio of fresh oil feed) serves also as "internal quench" to control reaction rate and peak operating temperatures. Because the highest temperatures experienced in the reactors are only a few degrees above the average temperature required to maintain processing objectives and not the higher "end of run" peak temperatures experienced in fixed bed reactor systems, the accelerated fouling rate of the catalyst by carbon deposition experienced in conventional fixed bed reactor systems at "end of run" conditions is minimized; however, the normal carbon deposition rate is much greater than that of the fixed bed reactor due to overall operating conditions.

In the U.S. Pat. No. 5,472,928 to Scheuerman et al., there is described a type of catalyst having a particle size, shape and density particularly useful in many upflowing packed bed reactor configurations. This catalyst has proven generally effective in both hydrometallation and hydrodesulfurization reactions. We have now studied that catalyst and made an improvement to it. Representative other patents relating to hydroprocessing of heavy liquid hydrocarbons include:

| | | |
|---|---|---|
| U.S. Pat. No. | 5,527,512 | Bachtel et al. |
| U.S. Pat. No. | 5,492,617 | Trimble et al. |
| U.S. Pat. No. | 5,589,057 | Trimble et al. |
| U.S. Pat. No. | 5,498,327 | Stangeland et al. |
| U.S. Pat. No. | 5,660,715 | Trimble et al. |
| U.S. Pat. No. | 5,648,051 | Trimble et al. |
| U.S. Pat. No. | 5,599,440 | Stangeland et al. |
| U.S. Pat. No. | 5,885,534 | Reynolds et al. |
| U.S. Pat. No. | 5,603,904 | Bachtel et al. |
| U.S. Pat. No. | 5,916,529 | Scheuerman |
| U.S. Pat. No. | 5,733,440 | Stangeland et al. |
| U.S. Pat. No. | 6,086,749 | Kramer et al. and |
| U.S. Pat. No. | 6,031,146 | Bachtel. |

SUMMARY OF THE INVENTION

In accordance with one aspect of this invention, there is provided an improved catalyst for use in the hydroprocessing of heavy feed streams. This catalyst is similar to the catalyst described in U.S. Pat. No. 5,472,928, but differs in having a somewhat lower density, a somewhat smaller average pore diameter, higher activity for hydrodesulfurization and lower activity for hydrodemetallation.

In accordance with another aspect of the invention, there is provided a two step hydroprocessing process in which a heavy feed stream is contacted with the catalyst of U.S. Pat. No. 5,472,928 or the like under hydrodemetallation conditions and the product of that contacting is then contacted with the catalyst of this invention for hydrodesulfurization. By removing metal with the first catalyst, the life of the second stage catalyst may be extended dramatically.

BRIEF DESCRIPTION OF THE DRAWINGS

This invention will be further described with reference to the accompanying drawings in which.

DETAILED DESCRIPTION OF THE INVENTION

Process Overview

Figure 1:
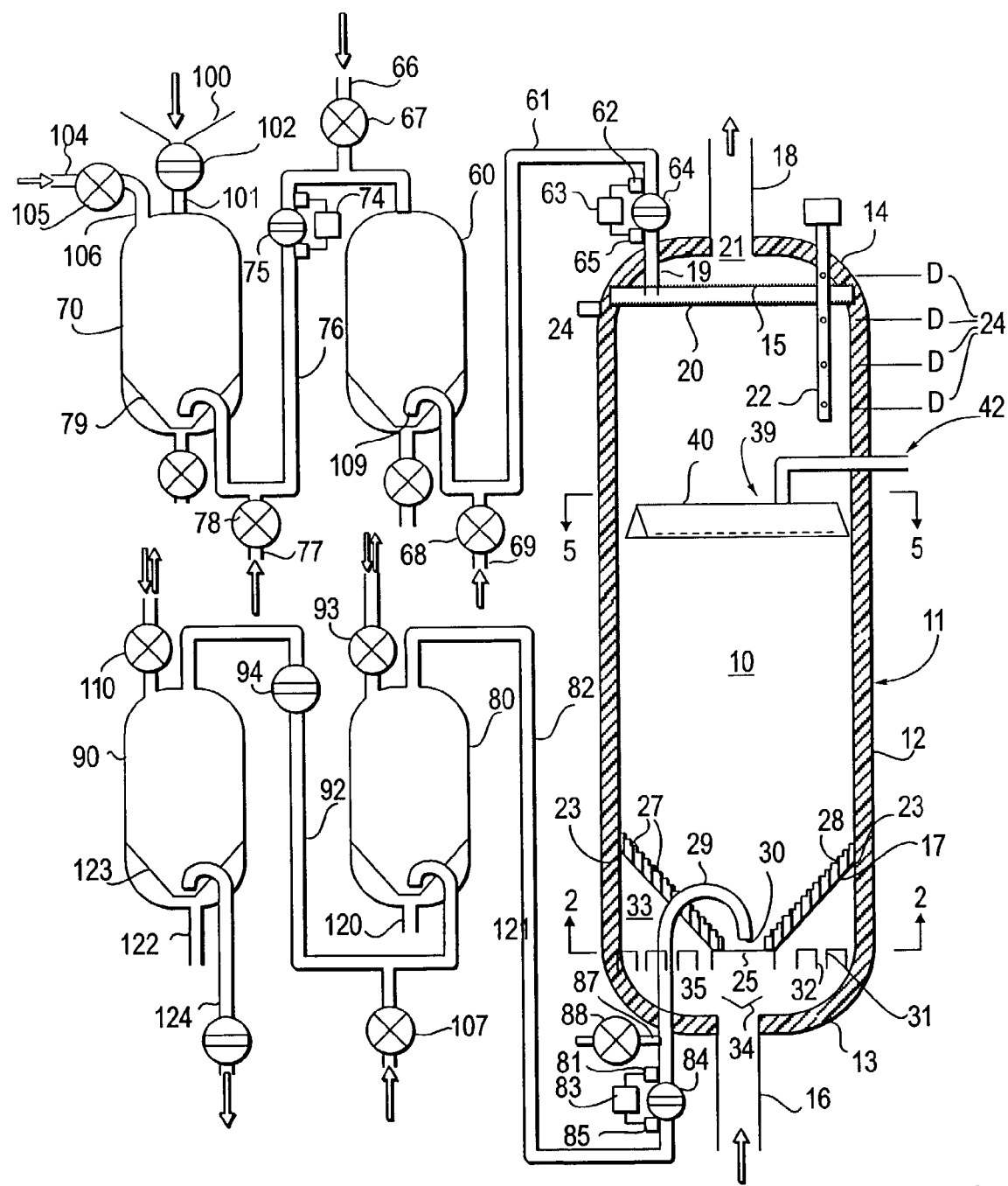
FIG. 1 is a schematic view of a typical hydroprocessing vessel in which the present catalyst can be employed. In this embodiment the vessel is equipped to facilitate on-stream catalyst removal.

The catalyst of this invention is employed in hydroprocessing. Such a process and particularly hydrodesulfurization can be carried out in an apparatus such as shown in FIG. 1 wherein the catalyst 10 is positioned within vessel 11. In this process sulfur-contaminated heavy feed is admixed with hydrogen and passed upflow into vessel 11 via line 16. Hdrodesulfurization takes place and desulfurized fee is removed via line 18.

Fresh catalyst is added via line 61 from vessels 70 and 60 while spent catalyst is removed via line 82 to vessels 80 and 90. This process will be described in more detail hereinafter.

The Catalyst

The catalyst provided by the present invention is characterized by somewhat smaller diameter pores and a somewhat lower density than the catalyst described in U.S. Pat. No. 5,472,928. It also has somewhat higher activity for hydrodesulfurization reactions and somewhat lower activity in hydrometallation reactions.

The catalyst of the present invention comprises an inorganic support which may include zeolites; inorganic oxides, such as silica, alumina, magnesia, titania and mixtures thereof; or any of the amorphous refractory inorganic oxides of Group II, III or IV elements; or compositions of the inorganic oxides. The inorganic support more preferably comprises a porous carrier material, such as alumina, silica, silica-alumina, or crystalline aluminosilicate.

Deposited on and/or in the inorganic support or porous carrier material are one or more metals or compounds of metals, such as oxides, where the metals are selected from the groups Ib, Vb, VIb, VIIb, and VIII of the Periodic System. Typical examples of these metals are iron, cobalt, nickel, tungsten, molybdenum, chromium, vanadium, copper, palladium, and platinum as well as combinations thereof. Preference is given to molybdenum, tungsten, nickel, and cobalt, and combinations thereof. Suitable examples of catalyst of the preferred type comprise nickel-tungsten, nickel-molybdenum, cobalt-molybdenum or nickel-cobalt-molybdenum deposited on and/or in a porous inorganic oxide selected from the group consisting of silica, alumina, magnesia, titania, zirconia, thoria, boria or hafnia or compositions of the inorganic oxides, such as silica-alumina, silica-magnesia, alumina-magnesia and the like.

The catalyst of the present invention may further comprise additives which alter the activity and/or metals loading characteristics of the catalyst, such as but not limited to phosphorus and clays (including pillared clays). Such additives may be present in any suitable quantities, depending on the particular application for the hydroconversion process including the applied catalyst. Typically, such additives would comprise essentially from about zero (0)% by weight to about 10.0% by weight, calculated on the weight of the total catalyst (i.e. inorganic oxide support plus metal oxides).

Although the metal components (i.e. cobalt, molybdenum, etc.) may be present in any suitable amount, the catalyst of the present invention preferably comprises from about 0.1 to about 60% by weight of metal component(s) calculated on the weight of the total catalyst (i.e. inorganic oxide support plus metal oxides) or and more preferably of from about 0.2 to about 40% by weight of the total catalyst, and most preferably from about 0.5 to about 30% by weight of the total catalyst. The metals of Group VIII are generally applied in a minor or lesser quantity ranging from about 0.1 to about 30% by weight, more preferably from about 0.1 to about 10% by weight; and the metals of Group VIB are generally applied in a major or greater quantity ranging from about 0.5 to about 50% by weight, more preferably from about 0.5 to about 30% by weight; while as previously mentioned above, the total amount of metal components on the porous inorganic support is preferably to about 60% by weight (more preferably up to about 40% by weight) of the total catalyst. The atomic ratio of the Group VIII and Group VIB metals may vary within wide ranges, preferably from about 0.01 to about 15, more preferably from about 0.05 to about 10, and most preferably from about 0.1 to about 5.

The groups in the Periodic System referred to above are from the Periodic Table of the Elements as published in Lange's Handbook of Chemistry (Twelfth Edition) edited by John A. Dean and copyrighted 1979 by McGraw-Hill, Inc., or as published in The Condensed Chemical Dictionary (Tenth Edition) revised by Gessner G. Hawley and copyrighted 1981 by Litton Educational Publishing Inc.

In a more preferred embodiment for the catalyst, the oxidic hydrotreating catalyst or metal oxide component carried by or borne by the inorganic support or porous carrier material is molybdenum oxide ($MnO_3$) or a combination of $MnO_3$ and nickel oxide (NiO) where the $MnO_3$ is present in the greater amount. The porous inorganic support is more preferably alumina. The Mo is present on the catalyst inorganic support (alumina) in an amount ranging from about 0.5 to about 50% by weight, preferably from about 0.5 to about 30% by weight, most preferably from about 1.0 to about 20% by weight, based on the combined weight of the inorganic support and metal oxide(s). When nickel (Ni) is present it will be in amounts ranging up to about 30% by weight, preferably from about 0.5 to about 20% by weight, more preferably from about 0.5 to about 10% by weight, based on the combined weight of the catalyst inorganic support and metal oxide(s). The oxidic hydrotreating catalyst or metal oxide component may be prepared by any suitable technique, such as by depositing aqueous solutions of the metal oxide(s) on the porous inorganic support material, followed by drying and calcining. Catalyst preparative techniques in general are conventional and well known and can include impregnation, mulling, co-precipitation and the like, followed by calcination.

The catalyst has a surface area (such as measured by the B.E.T. method) sufficient to achieve the hydroprocessing objectives of the particular application. Surface area is typically from about 100 sq. meters per gram to about 200 sq. meters per gram, more typically from about 110 sq. meters per gram to about 190 sq. meters per gram and especially 120–180 sq. meters per gram and more especially 130–170 sq. meters per gram. The support base has a surface area of from about 120–200 sq. meters per gram with areas of 130–190 and especially 140–180 sq. meters per gram being preferred.

The catalyst mean crush strength should be a minimum of about 5 lbs. Crush strength may be determined on a statistical sample of catalytic particulates. For example, a fixed number (say 30 catalyst particles) are obtained from a statistical lot comprising a plurality of catalyst particles that are to be employed in the hydrogenation process of the present invention. Each catalyst particle is subsequently disposed between two horizontal and parallel steel plates. A force is then applied to the top steel plate until the disposed catalyst particle breaks. The force applied to break the catalyst particle is the crush strength. The test is repeated for the remaining catalyst particles, and a mean crush strength is obtained. Preferably further, no more than about 35% by wt. of the catalyst particles or catalytic particulates have a mean crush strength of less than about 5 lbs.; more preferably, no more than about 15% by wt. of the catalyst particles or catalytic particulates have a mean crush strength of less than about 5 lbs; and most preferably, no more than about 0% by wt.

The catalyst of the present invention comprises a plurality of catalytic particulates having a uniform size, which is preferably close to spherical with a mean diameter having a value ranging from about 35 Tyler mesh to about 3 Tyler mesh, more preferably ranging from about 20 Tyler mesh to about 4 Tyler mesh, and most preferably from about 14 Tyler mesh to about 5 Tyler mesh. The Tyler mesh designations referred to herein are from a table entitled "Tyler Standard Screen Scale Sieves" in the 1981 Edition of Handbook 53, published by CE Tyler Combustion Engineering, Inc., 50 Washington St., South Norwalk, Conn. 06856.

Likewise, the preferred catalyst particle has a uniformly smooth and rounded surface. Preferred shapes include, for example, spheres, spheroids, egg-shaped particles and the like. More preferably, the catalyst of the present process is a rounded particle including a plurality of catalytic particulates having a size distribution such that at least about 90% by weight of said catalytic particulates have an aspect ratio of less than about 2.0, more preferably equal to or less than about 1.5. As used herein, "aspect ratio" is a geometric term defined by the value of the maximum projection of a catalyst particle divided by the value of the width of the catalyst particle. The "maximum projection" is the maximum possible catalyst particle projection. This is sometimes called the maximum caliper dimension and is the largest dimension in the maximum cross-section of the catalyst particle. The "width" of a catalyst particle is the catalyst particle projection perpendicular to the maximum projection and is the largest dimension of the catalyst particle perpendicular to the maximum projection.

The catalyst should have a particle size distribution such that the catalyst bed 10 expands under the conditions within the reactor vessel 11 to less than 10% by length (more preferably less than 5% and most preferably less than 1% by length) beyond a substantially full axial length of the substantially packed bed of the hydroprocessing catalyst in a packed bed state.

In order to maximize reactor throughput, the catalytic particulates have a narrow size distribution. The catalyst employed in the hydrogenation process of the present invention broadly comprises a size range or size distribution such that at least about 90% by weight, preferably at least about 95% by weight, more preferably, at least about 97% by weight, of the catalytic particulates in the catalyst bed 10 have a diameter ranging from $R_1$ to $R_2$ wherein: (i) $R_1$ has a value ranging from about 1/64 inch (i.e. the approximate opening size of a 35 mesh Tyler screen) to about 1/4 inch (i.e. the approximate opening size of a 3 mesh Tyler screen); (ii) $R_2$ also has a value ranging from about 1/64 inch (i.e. the approximate opening size of a 35 mesh Tyler screen) to about 1/4 inch (i.e. the approximate opening size of a 3 mesh Tyler screen); and (iii) the ratio $R_2/R_1$ has a value greater than or equal to about 1 and less than or equal to about 1.4 (or about the square root of 2.0). More preferably, the catalytic particulates in the catalyst bed 10 have a diameter ranging from $R_1$ to $R_2$ wherein $R_1$ and $R_2$ each has a value ranging from about 2/64 inch (i.e. the approximate opening size of a 20 mesh Tyler screen) to about 12/64 inch (i.e. the approximate opening size of a 4 mesh Tyler screen), most preferably from about 3/64 inch (i.e. the approximate opening size of a 14 mesh Tyler screen) to about 9/64 inch (i.e. the approximate opening size of a 5 mesh Tyler screen), and wherein the ratio $R_2/R_1$ has a value ranging from about 1.00 to about 1.4 (or about the square root of 2.0).

The catalyst of the present invention also broadly comprises a size range or size distribution such that a maximum of about 2.0% by weight (more preferably a maximum of about 1.0% by weight and most preferably a maximum of about 0.5% by weight or less) of the catalyst particles or catalytic particulates has a diameter less than $R_1$. The catalyst also has a size range or size distribution such that a maximum of about 0.4% by weight (more preferably a maximum of about 0.2% by weight and most preferably a maximum of about 0.1% by weight or less) of the catalyst particles or catalytic particulates have a diameter less than $R_3$, wherein $R_3$ is less than $R_1$ and the value of the ratio $R_1/R_3$ is about 1.4 (or about the square root of 2.0). The catalyst particles or catalytic particulates of the catalyst preferably have a maximum attrition of about 1.0% by weight (more preferably a maximum of about 0.5% by weight and most preferably a maximum of about 0.25% by weight or less) of the catalyst particles or catalytic particulates through a diameter (i.e., a Tyler screen opening) having a value of $R_1$, and a further maximum attrition of about 0.4% by weight (more preferably a maximum attrition of about 0.2% by weight and most preferably a maximum attrition of about 0.1% by weight or less) of the catalyst particles or catalytic particulates through a diameter (i.e., again a Tyler screen opening) having a value of $R_3$ wherein $R_3$ again (as stated above) is less than $R_1$ and the value of the ratio of $R_1/R_3$ is about 1.4 (or about the square root of 2.0). Note that the attrition procedure is specified in ASTM D 4058-87. However, in the standard method, the fines are removed through an 850.mu. (−20 mesh) screen. In the present method, the screen is an opening equal to the minimum catalyst size desired for the particular application, as more specifically defined by the value of $R_1$ and $R_3$. Thus, by way of example only, for a catalyst with a specified size range of about 10 to about 12 Tyler mesh, one would specify up to about 2.0% by wt. fines (more preferably up to about 1.0% by wt.) MAX through 12 Tyler mesh and up to about 0.4% by wt. (more preferably up to about 0.2% by wt.) MAX through 14 Tyler mesh. Similarly, for a catalyst with a specified size range of about 6 to about 8 Tyler mesh, one would specify up to about 2.0% by wt. fines (more preferably up to about 1.0% by wt. fines) MAX through 8 Tyler mesh and up to about 0.4% by wt. fines (more preferably up about 0.2% by wt. fines) MAX through 10 Tyler mesh. For the catalyst with the specified size range of about 10 to about 12 mesh, one would specify an attrition of up to about 1.0% by wt. (more preferably up to about 0.5% by wt., most preferably up to about 0.25% by wt.) MAX through 12 Tyler mesh and up to about 0.4% by wt., (more preferably up to about 0.2% by wt., most preferably up to about 0.1% by wt.) MAX through 14 Tyler mesh. Similarly further, for catalyst with the specified size range of about 6 to about 8 Tyler mesh, one would specify an attrition of up to about 1.0% by wt. (more preferably up to about 0.5% by wt., most preferably up to about 0.25% by wt.) MAX through 8 Tyler mesh and up to about 0.4% by wt. (more preferably up to about 0.2% by wt., and most preferably up to about 0.1% by wt.) MAX through 10 Tyler mesh.

The specific particle density of the catalyst particles is one parameter which distinguishes the hydrodesulfurization catalysts of this invention from the general purpose hydroprocessing catalysts of U.S. Pat. No. 5,472,928. For the present invention it is preferred that the catalyst particles have a uniform density. By "uniform density" is meant that the density of at least about 70% by weight, preferably at least about 80% by weight, and more preferably at least about 90% by weight, of the individual catalyst particles do not vary by more than about 10% from the mean density of all catalyst particles; and more preferably the individual catalyst particles do not vary by more than about 5% from the mean density of all of the particles. In a preferred embodiment of the present invention the catalyst (i.e. fresh catalyst) has a particle density ranging from about 0.7 g/cc to about 1.10 g/cc, more preferably from about 0.75 g/cc to about 1.00 g/cc, most preferably from about 0.79 g/cc to about 1.00 g/cc. The catalyst base has a particle density of from about 0.60 to about 1.00 g/cc and especially 0.65 to 0.90 and more especially 0.71 to 0.82 g/cc. This tends to be at the low end of the densities called for in U.S. Pat. No. 5,472,928, which are permitted to range as high as 1.5 g/cc for a fresh catalyst. After the catalyst has at least been partially spent, the particle density well range from about 0.9 g/cc to about 3.0 g/cc, more preferably from about 1.0 g/cc to about 3.0 g/cc as the catalyst leads to pick up weight in use.

The porosity of the catalyst should be controlled to have smaller pores than present in similar catalysts employed in the past. More particularly, the catalyst base, before metals or metal oxides are added, should have a peak pore diameter, as determined by nitrogen desorption, of from about 100–160 and especially, 110–150 and more especially 125–137. The finished catalyst should have such a peak pore diameter of 80–140 and especially, 90–130. This contrasts to the porosity of finished catalysts of the past which have $N_2$ desorption peak pore diameters of about 170 for their catalyst losses and about 150 for finished catalysts.

Another characteristic of the catalyst of this invention is to a low proportion of macropores. More specifically, the percentage of the total pore volume made up by macropores (as measured by mercury desorption) for the catalyst and the catalyst base is from 20–35% and more especially, 25–35%. Prior art catalysts and bases have 30–40% or a higher macropores of their total pore volume as macropores.

The catalysts have a mercury pore volume of 0.60 to 1.10 cc/g and especially 0.70–1.00 and more especially 0.74 to 0.95 cc/g. The bases which give these porosities have pore volume of 0.80–1.35 cc/g and especially 0.90–1.20 and 0.95–1.12 cc/g.

While the catalyst of the present invention may be any catalyst as defined above, we have discovered that the more preferred catalyst for optimally accomplishing the objectives of the present invention comprises in combination the following properties: (i) a porous inorganic oxide support; (ii) one or more catalytic metals and/or additional catalytic additives deposited in and/or on the porous inorganic oxide support; (iii) a crush strength at least about 5 pounds force; (iv) a uniform size ranging from about 6 to about 8 Tyler mesh sizes; (v) a fines content up to about 1.0% by weight through 8 Tyler mesh and up to about 0.2% by weight through 10 Tyler mesh; (vi) an attrition up to about 0.5% by weight through 8 Tyler mesh and up to of about 0.2% by weight through 10 Tyler mesh; (vii) a generally uniform close to spherical shape; and (viii) a uniform density ranging from about 0.79 g/cc to about 1.0 g/cc; a peak pore diameter ($N_2$ desorption) of 103–118 and from 25–35% or less of its pore volume as macropores (>1000 pores) as determined by Hg absorption.

We have discovered unexpectedly that the more preferred catalyst having or containing the immediate foregoing combination of properties, unexpectedly produces in an optimal fashion the plugflowing substantially packed bed (i.e. catalytic bed 11) of hydroprocessing (and particularly hrdrodesulfurizing) catalyst which is simultaneously expanding to less than 10% by length (more preferably less than 1% by length) beyond a substantially full axial length of the substantially packed bed of hydroprocessing catalyst in a packed bed state while (and simultaneously with) the substantially packed bed of hydroprocessing catalyst maximally and optimally occupying from about 75% by volume to about 98% by volume (i.e. the entire internal and/or inside available volume or reactor volume) of the reactor vessel 11.

The particular type of porous base material or inorganic oxide support, the particular type of catalytic metal, the pore structure, the catalyst surface area and catalyst size, would all depend on the intended specific application (e.g. demetallation, desulfurization, etc.) of the catalyst. Generally, the more preferred catalyst comprises a porous inorganic oxide support selected from the group consisting alumina, silica, and mixtures thereof, and has a surface area ranging from about 75 square meters per gram to about 150 square meters per gram. The preferred catalyst comprises catalytic metal (s), present as oxide(s) deposited in and/or on the porous inorganic support. Oxide(s) of the catalytic metal(s), or the metallic oxide component of the preferred catalyst, is selected from the group consisting of molybdenum oxide, cobalt oxide, nickel oxide, tungsten oxide, and mixtures thereof, and comprises from about 0.5 to about 50% by weight, more preferably from about 0.5 to about 30% by weight, of the total catalyst (i.e. inorganic oxide support plus metal oxide(s)). The more preferred catalyst further comprises a general uniform spherical shape having a mean diameter ranging from about 20 Tyler mesh to about 4 Tyler mesh. While a spherical shaped catalyst is the more preferred catalyst, an extrudate may be employed if it is very strong, say having a crush strength over 5 lbs. of force. The absolute size of the catalyst may vary from application to application, but the more preferred catalyst has the narrow size distribution as previously stated above.

Catalyst Preparation

The catalysts of this invention can be prepared by the following general process.

A solid support base of the described gross physical size is obtained. Its porosity is measured. Pore properties can be measured and a longer or shorter calcination selected to give the desired final properties.

Common calcination temperatures range from 1500° F. to 2250° F. and particularly 1600° F. to 1900° F. for from about 0.2 to about 3 and especially 0.5 to 2 hours.

Thereafter the catalyst is impregnated with desired metals and additives as solutions.

The impregnated catalyst is dried and heated to a temperature below its pore-adjusting calcination temperature such as 750° F. to 1200° F.

This heating ranges from 0.5 to about 4 hours.

Hydroprocessing

The catalyst and process of the present invention are applicable to hydroconversion reactions and particularly for hydrodesulfurization, all of which catalytically upgrade heavy hydrocarbonaceous oil that represents the liquid hydrocarbon stream or liquid hydrocarbon feed stream (i.e. the liquid hydrocarbon component LH). By "heavy" liquid hydrocarbon stream, as used herein and as previously indicated, is meant liquid hydrocarbon stream at least 50 volume percent of which boils above about 204° C. and which preferably contains a substantial fraction boiling above about 343° C. and particularly preferably above about 510° C. Preferred liquid hydrocarbon streams are residual fractions and synthetic crudes. They can be derived from crude petroleum, from coal, from oil shale, from tar sand bitumen, from heavy tar oils, and from other synthetic sources. The present invention is advantageously employed to refine highly refractory and contaminated liquid hydrocarbon streams. The liquid hydrocarbon stream may be substantially free from finely divided solids such as shale fines, sand or the like. Alternatively, the liquid hydrocarbon stream may contain a substantial concentration (e.g. about 1 weight percent or more) of finely divided solids. As previously indicated, the liquid hydrocarbon stream (i.e. the liquid hydrocarbon component LH) is preferably premixed with any type of hydrogen-containing gas (i.e. the hydrogen gas component HG) which is preferably hydrogen, before being introduced into the reactor vessel 11 as a single stream or hydrocarbon stream. The mixing ratios of the liquid hydrocarbon stream to the hydro containing gas may be any suitable ratio, well known to those artisans possessing the ordinary skill in the art.

Typically, heavy hydrocarbonaceous oil employed as a hydrocarbon feed stream in the present invention contains undesirable metals. Undesirable metals which are often present in hydrocarbonaceous feeds notably include nickel, vanadium, arsenic, and iron. These metals deactivate conventional, fixed bed catalysts (such as fixed bed hydroprocessing catalysts) and also rapidly and irreversibly deactivate catalysts when high metals level feed are charged directly to conventional units. These metals are often present as organo-metallic compounds. Thus, the use of the terminology "iron, nickel, arsenic or vanadium compounds" means, those metals in any state in which they may be present in the hydrocarbon feed stream in the process of the present invention, either as metal particles, inorganic metal compounds, or an organo-metallic compounds. Where amounts of metals are referred to herein, the amounts are given by weight based on the metal itself. For maximum efficiency in such a countercurrent demetallation process, the hydrocarbon feed stream should have levels of undesirable metals greater than about 150 ppm by weight of the hydrocarbon feed stream, preferably greater than about 200 ppm by weight of the hydrocarbon feed stream, and more preferably greater than about 400 ppm by weight. Although nickel, vanadium, arsenic, and iron are the usual metal contaminants, other undesired metals, such as sodium and calcium, may also contribute to the metals content of the hydrocarbon feed stream for purposes of catalytic demetallation upgrading processing.

Catalytic upgrading conditions (e.g. catalytic desulfurization conditions, etc.) employed in the hydroconversion reaction zone within the reactor vessel 11 for preferred embodiments of the present invention include a reaction temperature generally in the range of from about 230° C. to about 480° C., a pressure generally in the range of from about 30 to about 300 atmospheres, a hydrogen rate ranging from about 1000 to about 10,000 standard cubic feet per barrel of feed, and a liquid hourly space velocity (LHSV) generally in the range of from about 0.20 h–1 to about 10 h–1. For feed demetallation upgrading, the temperatures and pressures within the reaction zone can be those typical for conventional demetallation processing. The pressure is typically above about 500 psig (514.7 psia; 35.5 bars). The temperature is typically greater than about 315° C., and preferably above 371° C. Hydrogen is generally used and therefore requires full and equal distribution into the moving bed along with any gases evolving from the feed.

In carrying out a process of the preferred embodiments of the present invention, a minimum average level of catalytic feed upgrading activity for the counter currently moving catalyst bed (e.g. catalyst bed 10) as a whole is selected for the particular catalytic upgrading reaction. For a moving bed (e.g. catalyst bed 10) in a demetallation reaction system, for example, the minimum average upgrading activity level for the catalyst bed is one which removes the necessary amount of metals from the hydrocarbon feed stream when it passes through the moving bed at desulfurization conditions.

Similarly, for a desulfurization reaction system, the moving catalyst bed (e.g. catalyst bed 10) removes the necessary amount of sulfur from the hydrocarbon feed stream when it passes through the moving bed at desulfurization conditions. Thus, as will be apparent to those skilled artisans, the minimum average upgrading activity level for a particular reaction system will depend on the desired degree of a contaminant, such as metals, sulfur, nitrogen, asphaltenes, etc., which the refiner desires to remove from the heavy oil feed. The degree of desulfurization will typically be set by economics and the downstream processing that the heavy feed will undergo. Further, according to preferred embodiments of the present invention, the actual average level of catalytic upgrading activity for the catalyst bed (e.g. catalyst bed 10) as a whole is measured. Measurement of the actual average level of upgrading is made by determining the extent to which the hydrocarbon feed stream is being upgraded in the countercurrent moving bed system. For example, when upgrading involves desulfurization, desulfurization activity is, analogously, measured by a determination of the residual concentration of sulfur remaining in the liquid effluent from the reaction system. Overall catalyst bed upgrading activity for other upgrading reactions is measured in a similar manner by determining the residual amount of the containment which is to be removed by the process. In the present preferred embodiments, the rate at which catalyst is removed from the reaction zone, and the rate of catalyst replacement to the reaction zone, is established by a number of economic and operating factors, which include maintaining a desired average level of catalytic upgrading activity.

In nearly all applications, the hydroprocessing will remove metals and sulfur from the feedstock. The present catalyst is more effective at removing sulfur than it is at removing metals. Thus, it is often most efficient to use the present catalyst in combination with a second catalyst more effective at recovering metals. In one embodiment, the two catalysts can be mixed. In a more common approach the two catalysts are presented in separate sequential beds. These can be fixed beds or they can be gradually moving beds to permit on-stream catalyst replacement as described above. Such a process could involve two separate catalytic treatment zones, a first equipped with a catalyst of U.S. Pat. No. 5,472,928 for removing metals and the second equipped with the present catalyst to remove sulfur. Each of these zones can be configured like the zone of FIG. 1 to permit on-stream catalyst replacement.

When these two catalysts are employed, it is desirable to have a difference in peak pore diameter of from about 8% to about 20% and preferably from about 8% to about 15% between the material used in the first dematallation zone (larger pores) and the material used in the second hydrodesulfurization zone.

Referring to FIG. 1, a hydrodesulfurization system is shown embodying the catalyst and method of the present invention to increase substantially both the continued catalytic activity of a volume or bed of catalyst 10 and the efficient use of a single reactor vessel of a given reactor volume, such as reactor vessel 11. Vessel 11, as indicated by the thickness of its cylindrical side wall 12 and domed closure heads, or ends, 13 and 14, is designed to react a hydrogen containing gas mixed with a liquid hydrocarbon stream at a pressure of up to about 300 atmospheres (about 4500 lbs per square inch) and up to about 650° C. (about 1200° F.). Such reaction gas and a feed stream of hydrocarbon liquids are preferably premixed and introduced as a single stream through bottom head 13 by line 16.

To assure maximum catalytic benefit during the hydroprocessing of the hydrocarbon feed stream and the hydrogen-containing gas, it is desirable that vessel 11 contain as much catalyst as possible within the design volume of vessel 11. Accordingly as indicated, support means 17 for catalyst bed 10 is placed as low as possible in vessel 11 while assuring full and adequate dispersion of the hydrogen phase within the liquid hydrocarbon stream. At the same time, the upper limit of bed 10 is near the top of domed head 14, while providing an adequate space 21 for disengaging any entrained catalyst from the resulting products withdrawn through center pipe 18. To insure that catalyst is not entrained into product fluids exiting through center pipe 18, a screen 15 may be installed in space 21 above a bed surface 20 defining the top of the catalyst bed 10. Fresh catalyst is then added to bed surface 20 through pipe 19 extending through screen 15. Desirably, the upper level or top of the catalyst bed 10 designated as the bed surface 20, is preferably controlled on a continuous basis by gamma ray absorption measurement made possible by a gamma ray source 22 and gamma ray detector 24 positioned in close proximity to the bed surface 20 of catalyst bed 10. Such a gamma ray source may be in the form of radioactive isotopes, such as Cesium 137, disposed inside the reactor in a specially designed well. Alternatively the source can be an electrically controllable source, such as a thermal neutron activated gamma ray generator. Detector 24 may be in the form of an ionization tube, Geiger-Mueller tube or a scintillation detector. Suitable sources and detectors are manufactured by Ronan Engineering Co., Texas Nuclear and other vendors. By detecting the level of surface 20, it is possible, in accordance with the invention, to insure that the catalyst inventory is maintained at the optimum level and that the reactor is never overfilled.

Overfilling the reactor increases the chance that catalyst particles will be crushed in the isolation valves in the transfer lines when they are closed, at the end of each transfer. Bed level control is also needed to confirm that ebullation of the bed is minimized and that undesirable excursions from the design flow rate for hydrogen and hydrocarbon feed flowing upwardly through bed 10 are avoided. This assures that bed 10 progressively moves down through vessel 11 in layers as by a plug flow.

To further assure that plug flow continues throughout the full length of the bed, and particularly at the bottom portion, bed support means 17 may be particularly characterized by a truncated polygonal or conical configuration.

Support 17 can include a series of annular polygons, approaching the form of annular rings, formed by a plurality of segment plates 27 between radial ribs or spokes 26 extending from imperforate center plate 25 to sidewall 12 of vessel 11. Spokes 26 may be any suitable geometric shape, such as rod-like or substantially flat plates, which divide the circumference of the vessel into many segments and similarly support the ends of outer octagonal ring 23 of support means 17 formed by annular or circumferential plates 27. In each case, radial ribs or spokes 26, and annular segment plates 27 form a plurality of concentric rings, or annular polygons which support conical, or pyramidal, perforated plate or screen 28. Thus screen 28 is permeable to both gas and liquid rising from the lower portion of vessel 11.

The mixture of the hydrocarbon liquid feed and hydrogen gas that is to enter the catalyst bed 10 separates by gravity into radially alternate gas and liquid rings, made up of adjacent segments between each pair or radial spokes 26. Thus, both phases flow upwardly through alternate concentric annular passages under screen 28. The preferential separation of gas from liquid in each ring includes an annular cap segment of gas overlying an adjacent lower annular segment filled with liquid. Hence, both fluids have equal, and angularly adjacent, access to the bed through screen 28. The plurality of alternate annular rings of hydrogen gas and hydrocarbon liquid assure even and equal feed of both phases across the full cross-sectional area of screen 28 into bed 10. Among other factors, we have particularly found that this configuration insures even and equal distribution across the full cross-sectional area of the catalyst bed. Such equal distribution across the full diameter of the bed 10 permits a quiescent flow section to form directly above center plate 25 which truncates conical bed support means 17. This decreases substantially potential local ebullation or eddy currents from being induced in the catalyst bed at the point of catalyst withdrawal through inlet 30 of inverted J-tube 29 to assure localized laminar flow of catalyst and liquid from within bed 10.

Uniform feed of the mixture of the hydrocarbon feed stream and hydrogen is particularly facilitated to the inlet side of plates 27 of support means 17 through plenum or inlet chamber 33 enclosed between support 17 and circular plate member 31, which extends across the full cross-sectional area of vessel 11. The circular plate member 31 defines a grid-like structure for supporting a penneable screen 6 having one or more openings. The permeable screen 6 supports a bed 3 of a plurality of inert pellets 4 (e.g. alumina pellets) which are sized not to pass through the openings in the permeable screen 6, to prevent eddy currents in the plenum chamber 33, and to keep bubbles of hydrogen-containing gas diffused within the hydrocarbon feed streams. Plate 31 includes a multiplicity of similar large diameter tubes 32 forming openings through plate 31. Each tube is several inches in diameter and extends axially to a similar depth, say on the order of 4 to 6 inches, below plate provide equal access to the mixture of hydrogen and hydrocarbon feed stream into plenum chamber 33. Even distribution of the incoming feed stream into bottom header 35 from feed line 16 may also be assisted by deflector plate 34 to assure that oversized bubbles of hydrogen that may be contained in the feed stream will be equally distributed across the full cross-sectional area of plate 31 and equally distributed to each of tubes 32 for flow into plenum chamber 33. The length of tubes 32 may be selected to form a suitable gas head under plate 31 to suppress surges in the feed streams entering header 35.

As noted above, the vertical, transverse width or axial length of plates 27 which set off each individual annular and radial segment, provide equal access to both hydrogen and liquid feed into catalyst bed 10, and stepped under screen 28 so that they effectively form rings of gas and hydrocarbon feed alternately across the full diameter at the inlet side of catalyst bed 10. In this way, no single area of the inlet to catalyst bed 10 becomes a segregated or preferential, flow path for either gas or the liquid. Further, if pressure surges result in full wetting of screen 28 by the liquid phase, recovery of gas flow is assisted by the areal breadth of each segment between plates 27 and radial plates 26.

A liquid hydrocarbon component LH and a hydrogen-containing gas component HG (hydrogen-containing gas bubbles) enter as an LH-HG mixture into the plenum chamber 33 from tubes 32. The LH-HG mixture is introduced into the plenum chamber 33. In this preferred embodiment of the present invention, the annular or circumferential plates 27 are secured to and are supported by the radial ribs or spokes 26, each of which has a vertical or transverse width that is essentially equal to the vertical or transverse width of the annular or circumferential plates 27. The radial ribs or spokes 26 also function as a means for reducing a size of hydrogen-containing gas bubbles, especially over-size hydrogen-containing gas bubbles from the hydrogen-containing gas component HG. Those skilled in the art will readily recognize that the number of radial ribs or spokes 26 employed will depend on a number of factors, such as the anticipated number of over-size hydrogen-containing gas bubbles in the upwardly flowing hydrocarbon feed stream, the weight of the catalyst bed 10, etc. The interconnected plates 27 and radial ribs or spokes 26 form a web or web-like structure defining a plurality of annular mixture zones.

The flow rate of the hydrocarbon feed stream through line 16 is to be at a rate not substantially greater than the optimum rate of flow. The optimum rate of process fluid flow through the substantially packed bed of catalyst will vary from process unit to process unit based on several factors including oil and hydrogen feed characteristics. The flow rate of the hydrocarbon feed stream preferably ranges from about 0.01 ft/sec to about 10.00 ft/sec and more preferably from about 0.01 ft/sec to about 1.00 ft/sec.

To further assist in maintenance of plug-like flow of catalyst bed 10 throughout its axial length, there is additionally provided in a preferred form or embodiment of the invention a plurality of axially spaced apart hydrogen gas redistribution or hydrogen gas-quenching stages 39 within bed 10. In the arrangement of FIG. 1, the location of one of the gas redistribution stages 39 is illustrated by the single inverted angle member 40 extending transverse to the axis of bed 10. Quench gas is supplied via line 42. Desirably, but not necessarily, a second tier of sheds 40 is axially spaced above the first tier, with the sheds 40 in each tier being positioned at 90°) to the other tier.

FIG. 1 also shows a catalyst replacement system, which in general comprises a series of lock chambers for transferring fresh catalyst into bed 10 through a pair of pressure lock chambers, including charging vessel 60 and supply vessel 70. A similar series of lock chambers, including discharge vessel 80 and disposal vessel 90, transfer catalyst out of bed 10. If necessary, a single pair of vessels could be used to charge and discharge the catalyst, although the piping and sequencing procedure would be more complex. In both cases, transfer flow is specifically designed to be as a liquid slurry and laminar to avoid undue abrasion of catalyst particles going into reactor vessel 11 and to avoid abrupt agitation of the overlying bed of particles, with consequent ebullation and eddying of catalyst or fines in bed 10, when catalyst is withdrawn through inlet 30 of J-tube 29 at the bottom of reactor vessel 11.

To achieve laminar flow for supply of catalyst from charging vessel 60 to the top of reactor vessel 11 or for catalyst removal from the bottom of bed 10 to discharge vessel 80, it is essential that the pressure differential between reactor vessel 11 and vessels 60 or 80, be accurately controlled as by detecting the pressure differences between supply line 61 or discharge line 82 and reactor vessel 11. The pressure difference is best zero when shut-off valves 64 or 84 are first opened or closed. The pressure differences between vessel 11 and line 65 are measured by gage 63 and pressure detectors 62 and 65. Differential pressure gage 83 and detectors 81 and 85 serve a similar function to control transfer of catalyst through valve 84 from the bottom of reactor vessel 11 to discharge vessel 80.

With reference particularly to supply of catalyst from vessel 60, it will be understood, of course, that the vessel 60 is capable of being brought to a slightly higher pressure than the operating pressure of reactor vessel 11, and closely controlled to assure that catalyst supplied to vessel 60 from supply vessel 70 is by laminar flow. For this purpose, as indicated, vessels 70 and 60 are at atmospheric pressure, catalyst is first introduced into supply vessel 70 by way of funnel 100 through line 101 and valve 102, and nitrogen is preferably flushed through supply vessel 70 through line 106 and/or line 71 to eliminate air and moisture that may be present on the catalyst. Either before or after catalyst is introduced, vessel 70 is charged with a distillate hydrocarbon stream, preferably gas oil, to provide the necessary slurrying liquid for mixing and transporting catalyst. This may either be through funnel 100, valve 102, and line 101, or through line 104, valve 105 and line 106. Valve 102 is then closed and the catalyst is then preferably heated to dehydrate and eliminate water from the catalyst. It is to be understood that whenever the specification or the claims states, mentions, or implies "mixing" or "admixing" or "commingling" or any of the like, including of any type(s) of catalyst, such stated, mentioned, or implied verbiage means within the spirit and scope of the present invention any type of "mixing" or "admixing" or "commingling" or any of the like, including any incidental mixing or any otherwise non-thorough/nonhomogeneous mixing. Preferably, however, any type of "mixing" or "admixing" or "commingling", or any of the like, will be essentially thorough and/or essentially homogeneous.

An important requirement is that before transferring liquid to the charging vessel 60, the pressure in supply vessel 70 must be equalized to that in charging vessel 60, assuming, of course, that isolation valve 64 between vessel 60 and the reactor vessel 11 is closed, and also that valves 67, 68 and 78 are closed. With valves 64, 67, 68, 78 and 102 closed and pressure equalized between the vessels 60 and 70, transfer valve 75 may be opened to provide the same diameter path for the catalyst slurry to flow throughout the path from J-tube 71 to vessel 60. The transfer is closely controlled by regulating the nitrogen gas flow rate and pressure introduced from line 104 through valve 105. The pressure and flow rate are just sufficient to assure the desired laminar flow of catalyst into inlet 72 of J-tube 71 and thus upwardly through line 76 and into charging vessel 60, which forms a catalyst charging vessel. Laminar flow to transfer catalyst through J-tube 71 is entirely in the liquid phase, with the catalyst as slurry in the gas oil. Transfer of all catalyst is assisted by the funnel shape of bottom 79 of vessel 70, and the position of intake 72 to J-tube 71 at the apex of bottom 79. If all the catalyst in vessel 70 is transferred to vessel 60, flush oil from vessel 70 will naturally clear all the catalyst out of line 76. However, to assure that all such catalyst has passed through valve 75 (so that valve 75 need not close on hard, abrasive catalyst with potential danger of scoring the valve 75 or the valve seat therein) additional flush fluid is preferably introduced from line 77 through valve 76 to clear line 76, either back into vessel 70, or forward into vessel 60.

With catalyst thus loaded into vessel 60, a similar procedure is used for transferring catalyst under laminar flow conditions as liquid slurry into reactor vessel 11 through supply pipe 61 for distribution to the top 20 of bed 10. If desired, of course, a deflector plate (not shown) may be used to distribute catalyst evenly across the top of catalyst bed 20. However, we have found that such a distribution aid is not required. In the transfer of catalyst from the charging vessel 60 to reactor vessel 11, it will be understood that the pressure in vessel 60 is brought to the pressure of reactor vessel 11. This is done by injecting process hydrogen through valve 67. The oil should be heated to a temperature as close as possible to the temperature of reactants in vessel 11, without vaporizing the oil. We have found this to be particularly important to minimize any disturbance of the hydroprocessing process when fresh catalyst is added to an on-stream reactor vessel, such as reactor vessel 11. Once these requirements are met, valve 64 should be opened for transfer. The actual laminar transfer of the liquid slurry is controlled by valve 67 throttling the flow and pressure of hydrogen admitted from line 66. After transfer of the catalyst, valve 68 in flush line 69 is opened briefly to assure that any catalyst left in lines 61 and 19 is cleared before valve 64 is closed, for the reasons noted before. Excess hydrogen pressure in vessel 60 may be relieved in a controlled manner via a suitable bleed line running back to the common hydrogen source (not shown) of the hydroprocessing system.

Substantially continuous or intermittent transfer of deactivated catalyst for regeneration or disposal from the bottom of catalyst bed 10 in reactor vessel 11 to discharge vessel 80 is controlled in the same manner. As in all transfer of catalyst throughout the system of the present invention depicted in FIG. 1, the flow path from inlet 30 of J-tube 29, through line 82, including the bore of valve 84, is uniform in cross-sectional area and diameter. Similarly, transfer from discharge vessel 80 to disposal vessel 90 is through inlet 89 of J-tube 86 to discharge outlet 98 of line 92, including valve 94, into vessel 90. Deactivated catalyst is transferred laminarly from the bottom of the catalyst bed 10 as a slurry in the hydrocarbon feed stream which, as previously mentioned, comprises the liquid hydrocarbon feed stream or a mixture of hydrocarbon liquid feed and hydrogen-containing gas. Typically, the catalyst is transferred essentially in the liquid hydrocarbon feed stream (i.e. the liquid component of the hydrocarbon feed stream).

In general the diameter of these laminar flow passageways are at least five times, and may be as high as fifty or more times, the diameter of the individual particles to be passed therethrough. In this connection to avoid jamming or obstruction, the inlets 72, 109, 30, 89 and 99 into their respective tubes 71, 108, 29, 86 and 96 are not flared or otherwise restricted, or perforated, so that all flow is solely and directly through the full and equal bore of such inlets. In the case of catalyst removal from reactor vessel 11, inlet 30 of tube 29 is positioned at and over unperforated center plate 25 of catalyst support screen means 17, so that it is out of the direct flow of any hydrogen gas stream rising through the innermost annular passageway formed by walls 27 and radial ribs or spokes 26. This assures that flow into entry 30 is substantially a liquid only slurry mixture with catalyst particles. Such a mixture at laminar flow conditions produces maximum carrying capacity of the fluid. Additionally, the external dimensions of the circular bend or arc portion of the J-section of the tube 29 is several times the diameter of inlet 30 and the connected flow path, including the downwardly directed portion. The portion of tube 29 above inlet 30 is many times shorter and smaller in volume than the remainder of J-tube 29, down to, and including, control valve 84. A particular advantage of keeping this portion of tube 29 small is to avoid the necessity of forcing substantial amounts of catalyst back into the bed 11 against the gravity head of catalyst bed 10 when that portion of the line is cleared at the end of each transfer.

Desirably, during periods when the catalyst is not being transferred, a small amount of hydrogen may be continually bled through valve 88 into bed 10 through J-tube 29 to assure that catalyst particles do not clog entry This avoids potential build up of coke at entry 30 of pipe 29. Such an arrangement assures that catalyst can be withdrawn by laminar flow without artificially fluidizing or levitating bed 10 directly adjacent to J-tube entry 30.

Because gravity drainage of catalyst by an opening through the center of the catalyst support screen means 17 is not required in the present arrangement, as in the prior art, it is possible to operate the entire system without use of solids handling valves. Accordingly, each of the transfer valves in the present arrangement are preferably conventional ball valves formed with a single through bore in a rotatable ball. Specifically, we have found that conventional valves used to feed and control flow of hydrocarbons, catalyst and hydrogen, into and out of the vessel 11, must seal against high pressure differentials between the vessel and the transfer vessels. For this service, a solid satellite, spherical-ball valve having a through bore of the same diameter as the inlet and outlet lines to the valve and metal-to-metal seals, provides superior service when used in the catalyst transfer lines for carrying out the method of the present invention. Further, their commercial cost and ready availability for such severity of service makes them most useful economically, both for initial installation and for service replacement. Valves manufactured by The Kaymr and Mogas Companies; called full-port valves are particularly useful in the present embodiment. Further, the arrangement permits transfer of catalyst almost exclusively in a liquid phase which substantially reduces abrasion or comminution of catalyst particles during transfer. Additionally, exclusion of entrained gas substantially improves the efficiency of liquid transfer of catalyst particles and further reduces potential damage to the catalyst.

EXAMPLES

The following Examples are provided to illustrate the catalyst of this invention and its use in hydroprocessing process. They are not intended to limit the scope of this invention.

Example 1

Catalyst Preparation

A supply of alumina spheres (0.10 inch diameter) was obtained. This material had a peak pore diameter, as measured by nitrogen porosimitry of 160.

A sample of these spheres was placed in a calcining furnace at 1750° F. for 1 hour in dry air. The peak pore diameter was reduced to 135. The support had a surface area by ($N_2$ desorption) of 150 $m^2/g$ and a bulk density of 0.72 g/cc.

Other portions of the alumia spheres were calcined for longer or shorter periods which reduced the average pore diameter further or less. This provided an array of supports having the following pore diameters.

Support Peak Pore Diameter 75
115
135
150
160

These materials were each made into a hydroprocessing catalyst by adding nickel, molybdenum and phosphorus.

In a representative laboratory scale preparation; 177.75 grams of the alumia support (135 peak diameter) was rehydrated in water overnight.

The rehydrated support was separated from excess water and then contacted with an impregnating solution made from 50 g deionized water. 14.6 g of ammonium heptamolyodate (81.5% $M_oO_3$) 4 drops of concentrated $HNO_3$; 5.5 g conc $H_3PO_4$ (85.4% $H_3NO_4$ 61.8% $P_2O_5$). This solution was titrated with $NH_4$ to pH 3.95–4.15. Then 8.5 g of $Ni(NO_3)_2 \cdot 6H_2O$ was added (25.8% NiO) to give the impregnating solution. The bulk pore volume of the base was measured and the solution diluted with a few ml of water to equal this volume. The diluted solution was then sprayed onto the support and allowed to stand for 4 hours. The impregnated support was then dried for 4 hours at 250° F. and then heated at 1000° F. for 1 hour in 20 cubic feet/hour of dry air. This yielded 207.4 g of formulated catalyst made up of 84.70% w Alumia
10.50% w $MoO_3$
2.90% w $P_2O_5$
1.90% w NiO This material had a surface area of 150.4 m²/g. A particle density of 0.84 g/cc; a peak pore diameter of 113. The percentage of total pore volume attributable to pores larger than 1000 diameter was 32%.

Over time it was observed that, while they varied somewhat, in general the physical properties of consistently-prepared catalyst remained consistent, as well.

The total mercury pore volume for a range of preparations ranged from 0.74 to 0.89 cc/g; mercury pore volume attributable to pores with a diameter below 100 equaled 0.02 to 0.05 cc/g; mercury pore volume attributable to pores with a diameter above 1000 ranged from 0.21 to 0; 29 cc/g; for a macropore volume in percent of total volume of between 26 to 33% particle density ranged from 0.84 to 0.97 g/cc.

Other finished catalysts of the invention having peak pore diameters at 70, 110, 135 and 150 were prepared.

Example 2

Hydroprocessing Testing 120 cc's of the catalyst prepared as in Example 1 were charged to a pilot scale hydroprocessing reactor. The unit was operated in an upflow manner with a hydrogen pressure of 2000 psig and two pre-selected reactor temperatures of 713 F. and 755 F. over the course of a 750 hour test. The initial sulfur concentration in the feed was 4.44 wt % and it was reduced to 1.67% at 755 F. after 600 run hours. The initial vanadium concentration in the feed was 358 ppm, and it was reduced to 158 ppm.

A similar run was conducted using commercial catalyst with similar chemical composition but different pore diameter. In this run, initial feed sulfur of 4.44 wt % was reduced to 1.90% at 755 F. after 600 run hours; vanadium of 358 ppm in the feed was reduced to 137 ppm.

Figure 2:
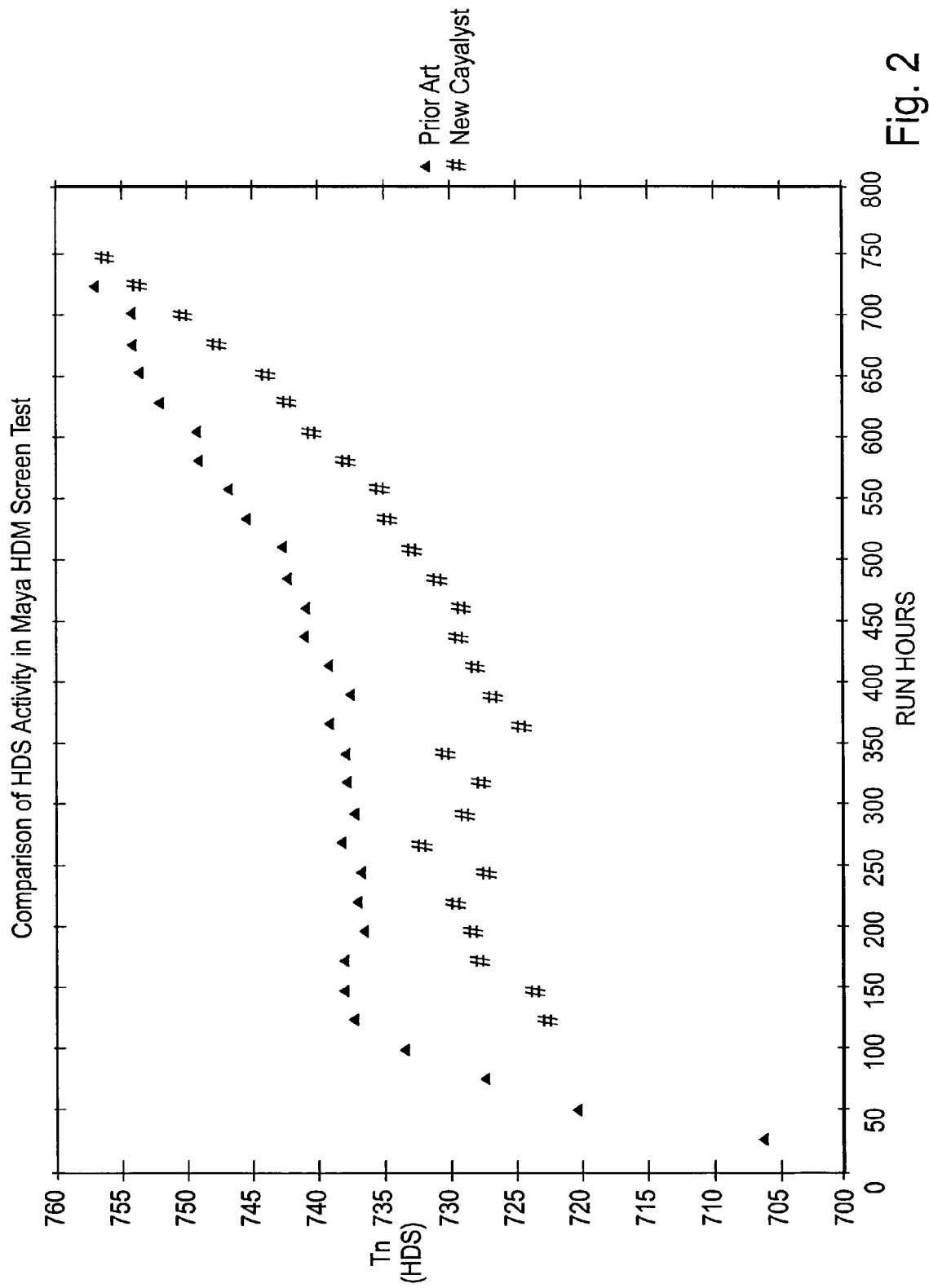
FIG. 2 is a graph showing the activity of a catalyst of this invention in hydrodesulfurization and comparing this activity to the activity of catalysts of the art.
Figure 3:
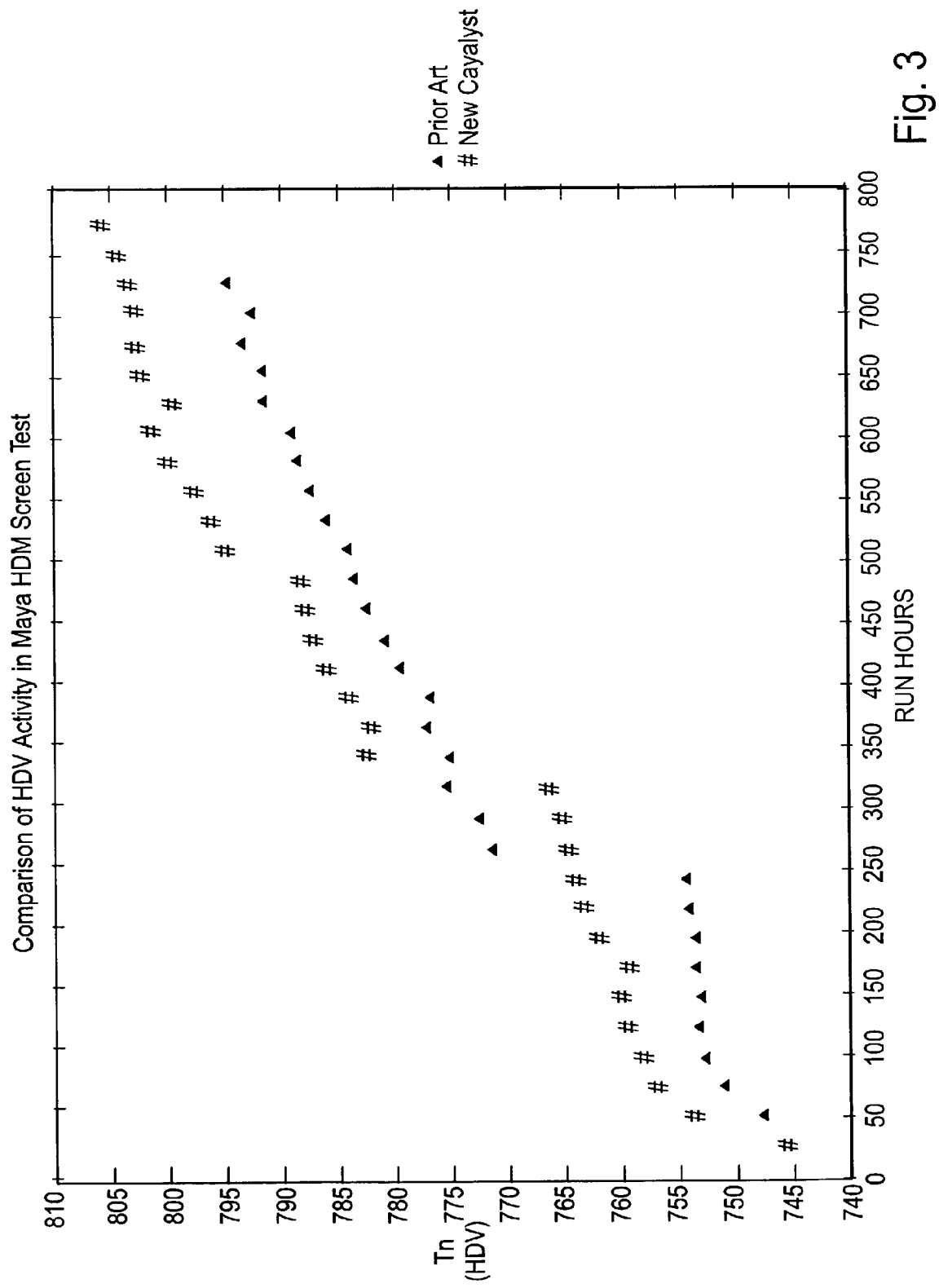
FIG. 3 is a graph showing the activity of a catalyst of this invention in hydromhydrometallation and comparing this activity to the activity of catalysts of the art.

The results of this comparative test are given in FIGS. 2 and 3 as the temperature requirement of each catalyst to maintain a constant conversion of either sulfur or vanadium. It is shown that in hydrodemetallization, the new catalyst was less effective than the prior art, larger pore catalyst as demonstrated by a higher temperature requirement to achieve identical conversion. In the case of hydrodesulfurization, the new catalyst was significantly more active. This suggests that an effective hydrotreating process could employ two separate stages. The first stage would be charged with a large pore catalyst of the prior art to remove metals efficiently. A second bed of the new catalyst would remove sulfur efficiently for prolonged periods in view of the decreased metal content from the effluent from the first stage.

What is claimed is:

1. A catalyst for hydrodesulfurization of a heavy hydrocarbon feed stock comprising a support consisting of alumina said support having on its surface a catalytically effective amount of hydrodesulfurization metal, said catalyst having a particle density of 0.70 to 1.10 g/cc, a mercury porosimetry pore volume of from about 0.60 to 0.1.10 cc/g, a surface area of 110–190 m2/g, less than 35% of its pores having a diameter greater than 1000 angstroms, and a nitrogen desorption peak pore diameter of 80 to 140 angstroms wherein said catalyst is in the shape of a sphere or spheroid and is of a size adapted for use in an upflow hydrodesulfurization zone.

2. A catalyst for hydrodesulfurization of a heavy hydrocarbon feed stock comprising a support consisting of alumina, said support having on its surface a catalytically effective amount of hydrodesulfurization metal, said catalyst having a particle density of 0.75 to 1.00 g/cc, a mercury porosimetry pore volume of from about 0.70 to 1.05 cc/g, a surface area of 120–180 m2/g, less than 35% of its pores having a diameter greater than 1000 angstroms, and a nitrogen desorption peak pore diameter of 90 to 130 angstroms wherein said catalyst is in the shape of a sphere or spheroid and is of a size adapted for use in an upflow hydrodesulfurization zone.

3. A catalyst for hydrodesulfurization of a heavy hydrocarbon feed stock comprising a support consisting of alumina said support having on its surface a catalytically effective amount of hydrodesulfurization metal, said catalyst having a particle density of 0.79 to 1.00 g/cc, a mercury porosimetry pore volume of from about 0.74 to 0.95 cc/g, a surface area of 130–170 m2/g, less than 35% of its pores having a diameter greater than 1000 angstroms, and a nitrogen desorption peak pore diameter of 103 to 118 angstroms wherein said catalyst is in the shape of a sphere or spheroid and is of a size adapted for use in an upflow hydrodesulfurization zone.

4. The catalyst of claim 1, 2 or 3 wherein the catalyst is of a size and shape adapted for on-stream catalyst replacement.

5. The catalyst of claim 4 wherein the hydrodesulfurization metal comprises molybdenum.

6. The catalyst of claim 5 wherein the hydrodesulfurization metal comprises nickel.

7. The catalyst of claim 6 additionally comprising phosphorous.

8. The catalyst of claims 1, 2 or 3 wherein the catalyst is substantially spherical particles about 0.10 inches in diameter.

9. A catalyst for hydrodesulfurization of a heavy hydrocarbon feed stock comprising an alumina support, said support having on its surface a catalytically effective amount of hydrodesulfurization metal, said support having a particle density of 0.60 to 1.00 g/cc, a mercury porosimetry pore volume of from about 0.80 to 1.35 cc/g, a surface area of 120–200 m2/g, less than 35% of its pores having a diameter greater than 1000 angstroms, and a nitrogen desorption peak pore diameter of 100 to 160 angstroms wherein said catalyst is in the shape of a sphere or spheroid and is of a size adapted for use in an upflow hydrodesulfurization zone.

10. A catalyst for hydrodesulfurization of a heavy hydrocarbon feed stock comprising a porous particulate support, said support having on its surface a catalytically effective amount of hydrodesulfurization metal, said support having a particle density of 0.65 to 0.90 g/cc, a mercury porosimetry pore volume of from about 0.90 to 1.20 cc/g, a surface area of 130–190 m2/g, less than 35% of its pores having a diameter greater than 1000 angstroms, and a nitrogen desorption peak pore diameter of 110 to 150 angstroms wherein said catalyst is in the shape of a sphere or spheroid and is of a size adapted for use in an upflow hydrodesulfurization zone.

11. A catalyst for hydrodesulfurization of a heavy hydrocarbon feed stock comprising an alumina support, said support having on its surface a catalytically effective amount of hydrodesulfurization metal, said support having a particle density of 0.71 to 0.82 g/cc, a mercury porosimetry pore volume of from about 0.95 to 1.12 cc/g, a surface area of 140–180 m2/g, less than 35% of its pores having a diameter greater than 1000 angstroms, and a nitrogen desorption peak pore diameter of 125 to 137 angstroms wherein said catalyst is in the shape of a sphere or spheroid and is of a size adapted for use in an upflow hydrodesulfurization zone.

12. The catalyst of claims 9, 10 or 11 wherein the catalyst is of a size and shape adapted for on-stream catalyst replacement.

* * * * *